Aug. 18, 1925. Re. 16,144
A. R. TALLMAN
COMBINATION FOUNTAIN PEN AND PENCIL
Original Filed Sept. 28, 1921
Fig. 1,
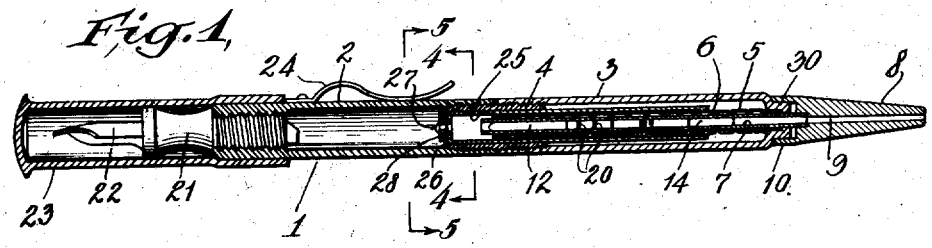
Fig. 2,
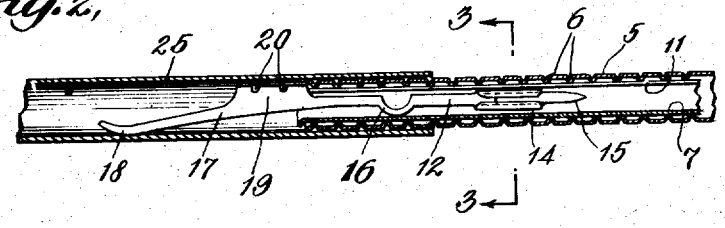
Fig. 3,
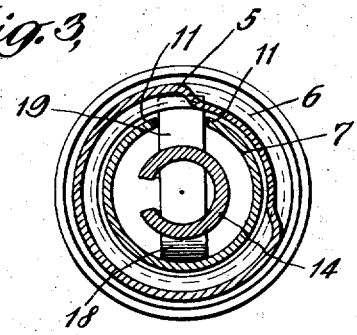
Fig. 4,
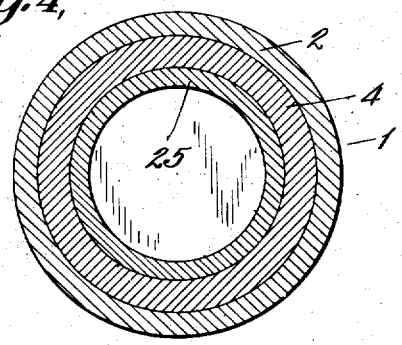
Fig. 5,
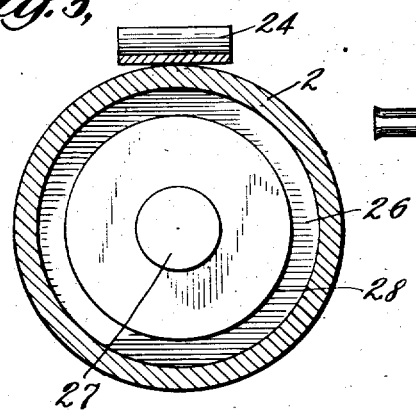
Fig. 6,
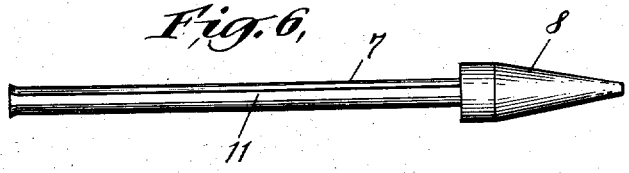
INVENTOR
ALBERT ROMAINE TALLMAN
BY Morris Hirschstein
ATTORNEY Reissued Aug. 18, 1925.

Re. 16,144

UNITED STATES PATENT OFFICE.

ALBERT ROMAINE TALLMAN, OF NASHVILLE, TENNESSEE, ASSIGNOR TO ED B. SULZBACHER, OF NASHVILLE, TENNESSEE.

COMBINATION FOUNTAIN PEN AND PENCIL.

Original No. 1,417,642, dated May 30, 1922, Serial No. 503,744, filed September 28, 1921. Application for reissue filed November 5, 1923. Serial No. 672,976.

*To all whom it may concern:*

Be it known that I, ALBERT ROMAINE TALLMAN, a citizen of the United States, residing at Nashville, in the county of Davidson and State of Tennessee, have invented a new and useful Combination Fountain Pen and Pencil, of which the following is a specification.

The device forming the subject matter of this application is a combination fountain pen and pencil. I am aware of the fact that, generally stated, an article comprising a barrel or holder, provided at one end with a pen and at the other end with a pencil, is old in the art. To such a broad combination, no claim is laid. A combined article of the sort alluded to is, however, a useful structure, and this application proposes, as one of its objects, the provision of a device, which, as an article of manufacture may be used as a combined pen and pencil, the construction being such that the length of the pen and pencil will not be increased materially, notwithstanding the fact that it combines the two instrumentalities above alluded to, and notwithstanding the fact that it includes a means for filling the pen, and a means for feeding the lead in the pencil.

Another object of the invention is to improve the construction of the pencil portion of the device, notably in so far as the lead-feeding mechanism is concerned.

It is within the province of the disclosure to improve generally and to enhance the utility of devices of that sort to which the invention appertains.

A single material embodiment has been depicted in the drawings, as an illustration of one form which the invention may take, but within the scope of what is claimed, a mechanic, exercising the skill of his calling, may work changes in that form, without departing from the spirit of the invention.

In the drawings:—

Fig. 1 shows in longitudinal section, an article constructed in accordance with the invention, sundry parts remaining in elevation;

Fig. 2 is a fragmental longitudinal section disclosing the sleeve portion of the lead-feeding means, and parts which co-operate therewith;

Fig. 3 is a transverse section taken on the line 3—3 of Fig. 2;

Fig. 4 is a transverse section taken on the line 4—4 of Fig. 1,

Fig. 5 is a transverse section taken on the line 5—5 of Fig. 1; and

Fig. 6 is an elevation depicting the tip of the pencil and the slotted tube which is carried thereby.

The device forming the subject matter of this application comprises a barrel, denoted generally by the numeral 1, and including tubular parts 2 and 3, united, detachably, by a tubular coupling 4, which may be threaded into the parts 2 and 3, the coupling preferably being fixed in the part 2, and the part 3 being removable from the coupling. The part 3 of the barrel has a reduced end 30.

A sleeve 5 is located within the part 3 and is fixed at its forward end to the reduced portion 30 of the said part. The sleeve 5 is provided with an internal thread 6, which may be pressed into the sleeve. A tube 7 is rotatably mounted within the sleeve 5 and is secured at its outer end to a tip 8, having a bore 9 which is co-axial with the bore of the tube 7, the tip having an annular flange 10 surrounding the reduced end 30 of the barrel-part 3. The tube 7 is provided with a longitudinal slot 11, shown best in Figures 6 and 3.

The lead-feeding means includes a plunger 12 disposed within the tube 7 and equipped at its forward end with a split resilient socket 14, adapted to hold the lead 15 which, in the operation of the device, is advanced through the bore 9 of the tip 8, as occasion may demand. Intermediate its ends, the plunger 12 is supplied with a transverse projection 16 which bears upon the inner surface of the tube 7. The plunger 12 terminates in a laterally inclined resilient arm 17 curved at its extremity to form a shoe 18, facilitating the sliding movement of the plunger along the bore of the tube 7. In Fig. 2, the plunger 12 is shown in a retracted position for two reasons: first, in order that the outline of the plunger may appear clearly; and, secondly, in order that the functions of divers parts of the device may be explained advantageously hereinafter. The plunger 12 and, more specifically, the resilient arm 17 thereof, is provided with a transversely extending fin 19 having notches or seats 20. The fin 19 slides in the slot 11 of the tube 7, the notches or seats 20 co-operating with the thread 6 of the sleeve 5. Since the sleeve 5 is fixed to the part 3 of the barrel, and serves as a mounting to permit the rotation of tube 7 with respect to the barrel, and since the plunger 12 is constrained to follow a right line movement in the tube 7, it is obvious that when relative rotation between the tip 8 and the part 3 of the barrel is brought about, the plunger 12 will be advanced, the lead 15 being advanced in the bore 9 of the tip 8. To hold the tube 7 against longitudinal movement with respect to sleeve 5, the tube 7 is provided with a flared inner end 7ª which restricts the sleeve 5 between said flared end 7ª and the tip 8 as shown in Figs. 2 and 6. With this explanation, the general operation of the pencil may be dismissed, since the nature of such an operation is well known.

It remains, however, to discuss the merits of the plunger 12, and in this connection it is to be observed that the resilient arm 17 of the plunger serves to hold the fin 19 in the slot 11 of the tube 7, and to hold the notches 20 of the fin in co-operating relation to the thread 6 of the tube 7, the projection 16 co-acting with the tube 7, to secure this result. The projection 16, being formed by curving or bending the plunger 12, renders the forward end of the plunger comparatively rigid, the lead 15 being held always in such a position that it will enter the bore 9 of the tip 8, notwithstanding the fact that the arm 17 of the plunger is resilient.

The numeral 21 marks a tip, carrying a pen point 22, the tip being seated removably by threading or otherwise, in the part 2 of the barrel 1. The tip is a commercial article, for which no novelty is claimed, and any kind of a tip, as a matter of fact, may be used. The pen point 22 is housed beneath a cap 23, mounted detachably on the part 2 of the barrel 1. Any desired portion of the barrel may be provided with the usual pocket-clip 24.

The numeral 25 denotes a tubular plunger which is slidable in the parts 2 and 3 of the barrel and is supported immediately for sliding movement in the coupling 4, the coupling, therefore, exercising a two-fold office. A head 26 is attached in any desired way to the inner end of the plunger 25, and fits closely but slidably in the part 2 of the barrel 1. The head may be held in place by a stud 27 on the plunger, and a washer 28 on the stud.

The part 3 of the barrel may be detached from the part 2 the lead feeding mechanism withdrawn and by pushing and retracting the plunger 25, in the ink reservoir, a charge of ink may be sucked into the member 2, through the tip 21, the elements 25 and 26 acting as a piston.

Especial attention is directed to the fact that when the plunger 25 is retracted, as aforesaid, and when the parts 2 and 3 of the barrel are again assembled, the sleeve 5 is received within the plunger. As a consequence the article embodies, in a combined pen and pencil, longitudinally movable lead-feeding and pen-charging means, telescoped with respect to each other, the length of the article being cut down accordingly.

If the notches 20 in the plunger 12 do not happen to be engaged with the thread 6 of the sleeve 5 when the plunger 25 is slid about the sleeve 5, then, as indicated in Fig. 2, the plunger 25 will flex the end 17 of the plunger 12 sufficiently to bring the notches into the position shown in Fig. 2, and the friction between the plunger 25 and the part 18 of the plunger 12 will advance the plunger 12 until the notches 20 catch the thread 6.

Having thus described the invention, what is claimed is:

1. In a combined pen and pencil, a barrel, longitudinally movable lead-feeding means in the barrel, and longitudinally movable pen-charging means in the barrel, the lead-feeding means and the pen charging means being telescoped within the barrel with respect to each other, to minimize the length of the article.

2. An article of manufacture for use in the making of a combined pen and pencil having a minimum length, comprising barrel members; means for connecting said members detachably; a piston co-operating with one barrel member and including a tubular plunger slidable in both barrel members; and lead-feeding mechanism embodying a sleeve whereon the plunger is telescoped, the sleeve being secured to the other barrel member.

3. An article of manufacture for use in the making of a combined pen and pencil having a minimum length, comprising barrel members; a combined guide and coupling fixed to one barrel member and received removably in the other barrel member; a piston co-operating with one barrel member and including a plunger located in both barrel members and mounted slidably in the combined guide and coupling; and a lead-feeding mechanism embodying a threaded element telescoped with respect to the plunger, said element being secured to the other barrel member.

4. In a pencil, a barrel member; a sleeve carried thereby; a tube rotatable in the sleeve; a plunger held for right line movement in the tube and including a part having threaded connection with the sleeve, the plunger comprising a resilient arm co-operating with the tube to hold said part of the plunger in threaded engagement with the sleeve; a second barrel member; and means for connecting the barrel members detachably, the second barrel member carrying a part co-operating with the resilient arm of the plunger, to bring said part of the plunger into threaded connection with the sleeve, when the plunger is in retracted position.

5. In a combined pen and pencil, a barrel, lead feeding means in the barrel, pen charging means in the barrel, said lead feeding means and said pen charging means overlapping each other within the barrel so as to minimize the length of the combined article.

6. In a combined pen and pencil, a barrel, lead feeding means in the barrel, pen charging means in the barrel, said lead feeding means and said pen charging means fitting one into the other within the barrel so as to minimize the length of the combined article.

7. In a combined pen and pencil, a barrel, longitudinally movable lead feeding means in the barrel, longitudinally movable pen charging means in the barrel, said lead feeding means and said pen charging means fitting one into the other within the barrel so as to minimize the length of the combined article.

In testimony whereof, I have hereto affixed my signature.

ALBERT ROMAINE TALLMAN.